United States Patent [19]

Mori

[11] 4,410,032

[45] Oct. 18, 1983

[54] RADIATOR GRILLE STRUCTURE

[75] Inventor: Shinya Mori, Yokohama, Japan

[73] Assignee: Nissan Motor Company, Limited, Kanagawa, Japan

[21] Appl. No.: 329,426

[22] Filed: Dec. 10, 1981

[30] Foreign Application Priority Data

Dec. 26, 1980 [JP] Japan .................... 55-186634[U]

[51] Int. Cl.³ .............................................. F28F 13/08
[52] U.S. Cl. .................................. 165/44; 123/41.06; 123/41.58; 165/98
[58] Field of Search ................. 165/44, 98; 123/41.58, 123/41.04, 41.05, 41.06; 180/68 R, 68 P, 69 R

[56] References Cited

U.S. PATENT DOCUMENTS 1,950,792 3/1934 Green ..................................... 165/98
2,396,598 3/1946 Neumann et al. ................. 123/41.58

FOREIGN PATENT DOCUMENTS 355209 12/1920 Fed. Rep. of Germany ........ 165/98
687857 1/1940 Fed. Rep. of Germany ........ 165/44
405561 2/1934 United Kingdom ............. 123/41.58

Primary Examiner—Sheldon J. Richter

[57] ABSTRACT

Herein disclosed is a radiator grille structure for attachment to the front end of an automotive vehicle having a fore-and-aft direction, comprising a stationary grille to be secured to the vehicle body of the automotive vehicle and comprising a plurality of horizontally elongated lamellar plates vertically spaced apart from each other and respectively having front end portions bent downwardly and forwardly for forming therebetween gaps to pass ram air therethrough, a movable grille comprising a plurality of horizontally elongated lamellar plates vertically spaced apart from each other and respectively having front end portions bent downwardly and forwardly, the lamellar plates of the moveable grille being arranged alternately to the lamellar plates of the stationary grille, the movable grille being movable in the fore-and-aft direction with respect to the stationary grille so as to cause the front end portions of the lamellar plates to move toward and away from positions closing the gaps, respectively, and driving means for driving the movable grille to move in the fore-and-aft direction with respect to the stationary grille.

5 Claims, 5 Drawing Figures

RADIATOR GRILLE STRUCTURE

FIELD OF THE INVENTION

The present invention relates to a radiator grille structure for attachment to the front end of the automotive vehicle.

SUMMARY OF THE INVENTION

In accordance with the present invention, there is provided a radiator grille structure for attachment to the front end of an automotive vehicle having a fore-and-aft direction, comprising a stationary grille to be secured to the vehicle body of the automotive vehicle and comprising a plurality of horizontally elongated lamellar plates vertically spaced apart from each other and respectively having front end portions bent downwardly and forwardly for forming therebetween gaps to pass ram air therethrough, a movable grille comprising a plurality of horizontally elongated lamellar plates vertically spaced apart from each other and respectively having front end portions bent downwardly and forwardly, the lamellar plates of the movable grille being arranged alternately to the lamellar plates of the stationary grille, the movable grille being movable in the fore-and-aft direction with respect to the stationary grille so as to cause the front end portions of the lamellar plates to move toward and away from positions closing the gaps, respectively, and driving means for driving the movable grille to move in the fore-and-aft direction with respect to the stationary grille.

DESCRIPTION OF THE DRAWINGS

Drawbacks of a prior-art radiator grille structure and details and advantages of a radiator grille structure according to the present invention will be understood clearly from the following description taken in conjunction with the accompanying drawings in which.

BACKGROUND OF THE INVENTION

Figure 1:
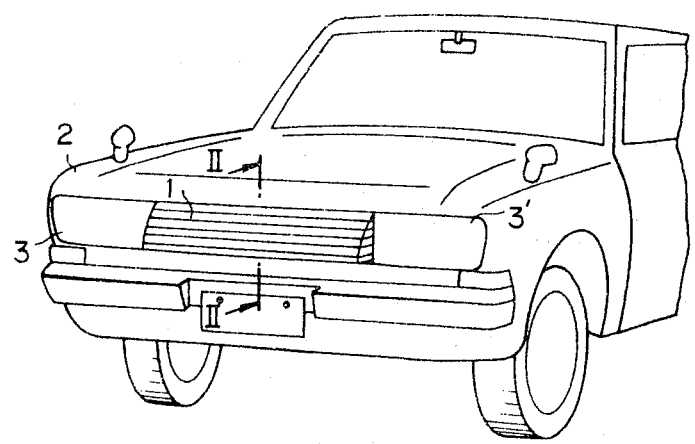
FIG. 1 is a fragmentary perspective front end view of an automotive vehicle showing a prior-art radiator grille structure.
Figure 2:
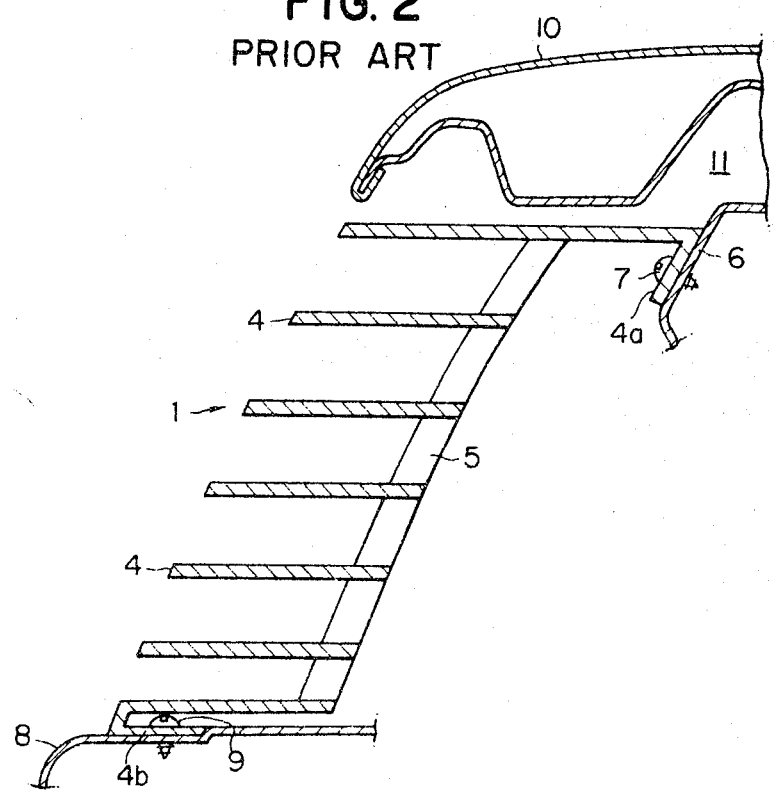
FIG. 2 is a fragmentary enlarged cross sectional view taken on line II—II of FIG. 1.

Description will be first made with reference to FIGS. 1 and 2 which show a prior-art radiator grille structure 1 of an automotive vehicle 2. The prior-art radiator grille structure 1 herein shown is of a stationary type and is arranged between horizontally spaced headlights 3 and 3' at the front end of the vehicle body of the automotive vehicle for inhaling ram air to cool a radiator of a radiator system. The prior-art radiator grille structure 1 comprises a plurality of horizontally elongated lamellar plates 4 vertically spaced apart from each other for forming therebetween gaps to pass ram air therethrough and a plurality of vertically elongated reinforcement members 5 interconnecting the lamellar plates 4 at the rear ends thereof and horizontally spaced apart from each other. The uppermost lamellar plate 4 projects rearwardly from the reinforcement members 5 and has a cranked end portion 4a fastened to a radiator core support member 6 by means of screws 7. Further, the lowermost lamellar plate 4 has a turn-back front end portion 4b fastened to a front apron member 8 by means of screws 9. The lamellar plates 4 and the reinforcement members 5 are constructed of a synthetic resin. An engine hood 10 is locked in a position closing an engine compartment 11 and has a front edge extending to the front edge of the uppermost lamellar plate 4 of the radiator grille structure 1.

The design of the radiator grille structure 1 depends upon the minimum flow rate of ram air to pass through the radiator grille structure during crusing of the automotive vehicle at a low speed, and the gaps formed between the lamellar plates 4 are maintained constant and not variable during crusings of the automotive vehicle at high and low speeds. This results in the fact that when the flow rate of ram air to pass into the vehicle body through the gaps is increased to an unnecessary value during crusing of an automotive vehicle at a high speed, the aerodynamic loss is increased, resulting in deteriorating fuel consumption of the engine of the automotive vehicle.

BRIEF DESCRIPTION OF THE OBJECT

It is, accordingly, an object of the invention to provide a radiator grille structure which comprises a plurality of lamellar plates havig front end portions bent downwardly and forwardly and forming gaps therebetween, the gaps being variable in response to crusing speeds of the automotive vehicle so as to decrease the aerodynamic loss of the radiator grille structure.

DESCRIPTION OF THE EMBODIMENTS

Figure 3:
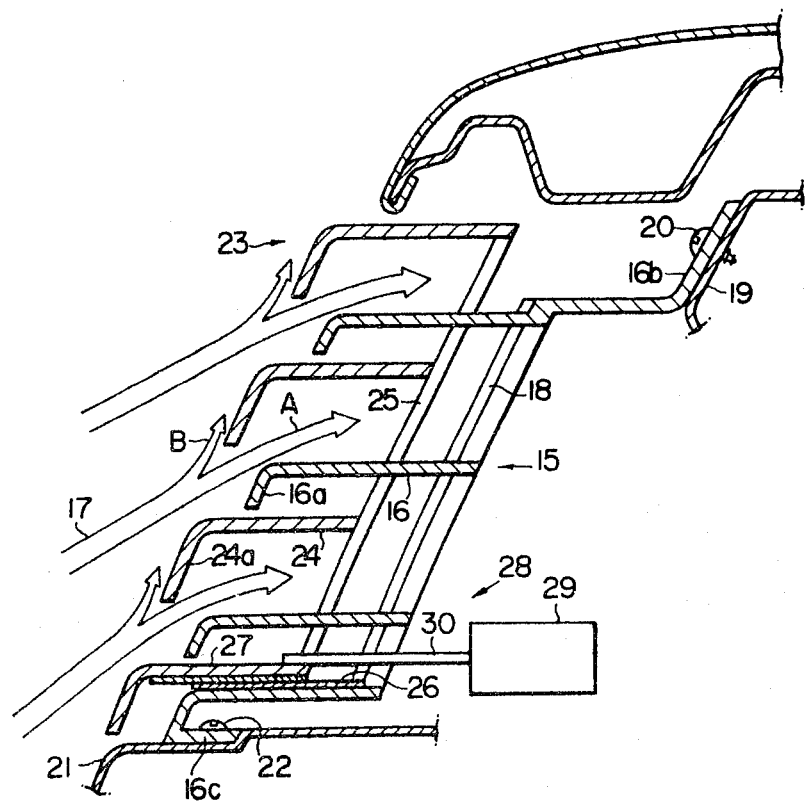
FIG. 3 is a cross sectional view similar to FIG. 2 but showing an embodiment of the radiator grille structure according to the present invention.

Referring to FIG. 3 of the drawings, there is shown a radiator grille according to the present invention which is to be attached to the front end of an automotive vehicle having a fore-and-aft direction. The radiator grille structure comprises a stationary grille 15 which comprises a plurality of horizontally elongated lamellar plates 16 vertically spaced apart from each other. The lamellar plates 16 respectively has front end portions 16a bent downwardly and forwardly for forming therebetween gaps to pass through ram air 17 therethrough. The stationary grille 15 further comprises a plurality of vertically elongated reinforcement members 18 interconnecting the lamellar plates 16 at the rear ends thereof. The uppermost lamellar plate 16 projects rearwardly from the reinforcement members 18 and has a cranked end portion 16b fastened to a radiator core support member 19 by means of screws 20. The lowermost lamellar plates 16 has a turn-back front end portion 16c fastened to a front apron member 21 by means of screws 22. The radiator grille structure further comprises a movable grille 23 which comprises a plurality of horizontally elongated lamellar plates 24 vertically spaced apart from each other and respectively having front end portions 24a bent downwardly forwardly toward the upper surface of the lamellar plate 16 adjacent to the lamellar plate 24. The movable grille 23 further comprises a plurality of vertically elongated reinforcement members 25 interconnecting the lamellar plates 24 at the rear ends thereof in such a manner that the reinforcement members 25 are arranged alternately to the reinforcement member 18 in the horizontal direction of the radiator grille structure. The lamellar plates 24 of the movable grille 23 are arranged alternately to the lamellar plates 16 of the stationary grille 15 in such a manner that the front end portions 24a of the lamellar plates 24 are arranged forwardly of the front end portions 16a of the lamellar plates 16. A slide plate 26 is securely mounted on the upper surface of the turn-back front end portion 16a of the lowermost lamellar plate 16 and is held in slidable contact with a slide plate 27 also securely mounted on the lower surface of the lowermost lamellar plate 24. The movable grille 23 is adapted to be movable in the fore-and-aft direction with respect to the stationary grille 15 between an opened position where the gaps between the front end portions of the lamellar plates 16 and 24 are closed and a closed position where the gaps between the front end portions of the lamellar plates 16 and 24 are opened so that the flow rate of ram air to pass through the gaps are variably adjusted.

Figure 4:
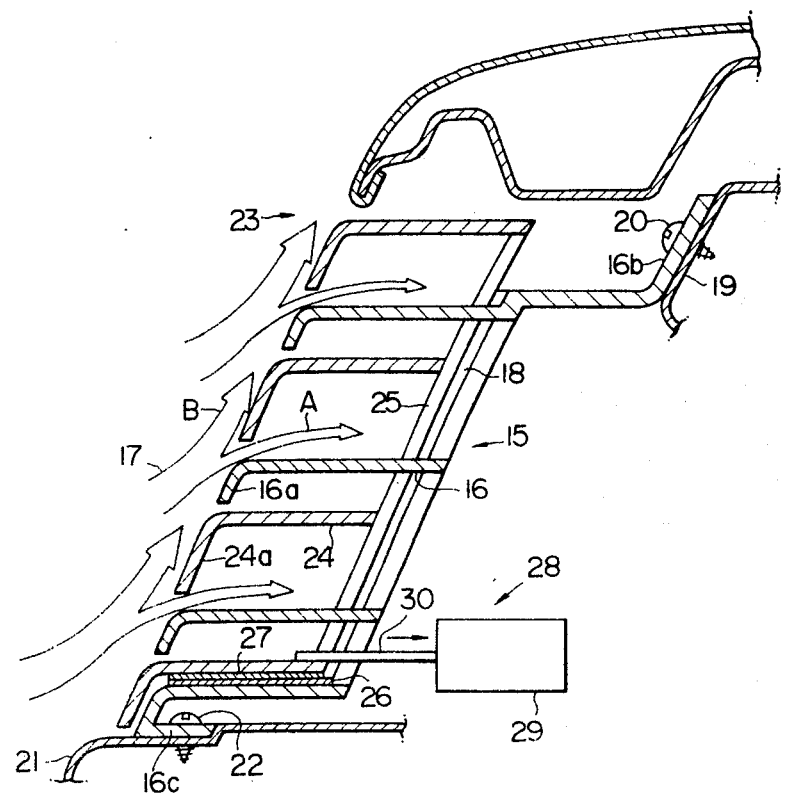
FIG. 4 is a cross sectional view similar to FIG. 3 but showing an operational condition in which a movable grille is moved in the fore-and-aft direction of the automotive vehicle with respect to a stationary grille by an actuator.

The radiator grille structure according to the present invention further comprises driving means 28 for driving the movable grille 23 to move in the fore-and-aft direction with respect to the stationary grille 15. The driving means comprises an actuator 29 secured to the vehicle body (not shown) of the automotive vehicle and having a plunger 30 connected at its leading end to the lowermost lamellar plate 24 of the movable grille 23. The actuator 29 is operative to cause the plunger 30 to project forwardly and retract rearwardly while the automotive vehicle is crusing at low and high speeds, respectively so that the movable grille 23 can assume the opened and closed positions (see FIG. 4), respectively. The projection and retraction of the plunger 30 can be adjusted in response to the crusing speeds of the automotive vehicle by a suitable controlling unit not shown.

The operation of the radiator grille structure will now be described hereinlater.

During crusing of the automotive vehicle at a relatively low speed, the movable grille 23 is caused to assume the opened position as shown in FIG. 3 by the actuator 29. At this time, the flow rate of ram air to pass through the gaps between the lamellar plates 16 is increased while the flow rate of ram air to ascend along the front end portions 24a of the lamellar plates 24 is decreased as indicated by arrows A and B, respectively, in FIG. 3. The increased flow rate A of ram air gives rise to little effect to the aerodynamic loss due to a relatively small amount of air flow striking against the vehicle body.

As the automotive vehicle increases speeds, the plunger 30 is projected by the actuator 29 in response to the crusing speeds of the automotive vehicle and causes the movable grille 23 to move toward the closing position. Therefore, the gaps between the lamellar plates 16 and 24 become increasingly narrow so that the flow rate A of the ram air to pass into the vehicle body through the gaps is decreased while the flow rate B of ram air to ascend along the front end portions 24a of the lamellar plates 24 is increased. The flow rate B at a certain relative speed with respect to the vehicle body has a component velocity which offers a resistance to the automotive vehicle in a direction reverse to the forward crusing of the automotive vehicle. The component velocity of the flow rate B always has a value smaller than that of the flow rate A at the same relative speed so that the aerodynamic loss is diminished to a relatively small value, thereby reducing the fuel consumption of an engine to a minimum level.

The previously mentioned actuator 29 may be of the solenoid-operated, vacuum-operated type or may use a mechanical linkage which can be manipulated by a driver in the passenger compartment according to the present invention.

Figure 5:
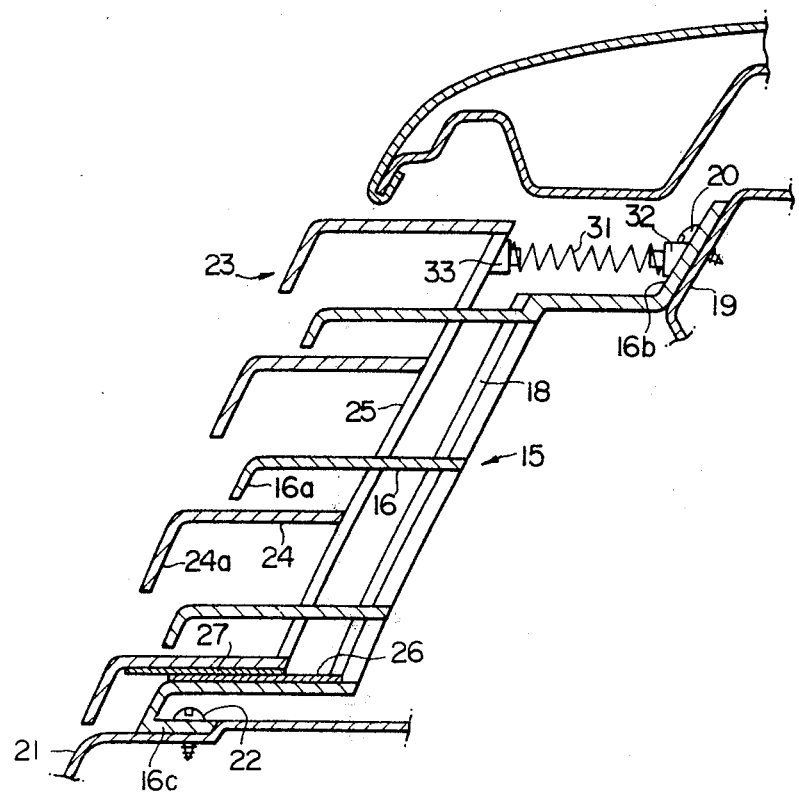
FIG. 5 is a cross sectional view similar to FIG. 3 but showing another embodiment of the radiator grille structure according to the present invention.

In FIG. 5 of the drawings, there is shown another embodiment of the present invention in which a compression coil spring 31 is used as the driving means 28 in place of the actuator 29 and the plunger 30. The coiled compression coil spring 31 is connected at one end to a stop projection 32 formed on the front surface of the cranked end portion 16b of the uppermost lamellar plate 16 of the stationary grille 15 and at the other end to another projection 33 formed on the rear surface of the reinforcement member 25 of the movable grille 23, and thus causes the movable grille 23 to be urged at all times in the fore direction of the automotive vehicle as shown in FIG. 5. In this instance, the movable grille 23 is automatically moved toward the stationary grille 15 by an aerodynamic force on the front end portions 24a of the lamellar plates 24 thereof against the coiled compression spring 31 during crusing of the automotive vehicle at high speeds so that the flow rate A of ram air to pass through the gaps between the lamellar plates 16 of the stationary grille 15 can be decreased in a manner similar to FIG. 4. The movable grille 23 is caused to move toward its closing position by the coiled compression spring 31 as the automotive vehicle is decreased in speeds. The movement of the movable grille 23 depends upon the spring constant of the coiled compression spring 31 and the crusing speeds of the automotive vehicle.

What is claimed is:

1. A radiator grille structure for attachment to the front end of an automotive vehicle having a fore-and-aft direction, comprising:

a stationary grille to be secured to the vehicle body of the automotive vehicle and comprising a plurality of horizontally elongated lamellar plates vertically spaced apart from each other and respectively having front end portions bent downwardly and forwardly for forming therebetween gaps to pass ram air therethrough, a movable grille comprising a plurality of horizontally elongated lamellar plates vertically spaced apart from each other and respectively having front end portions bent downwardly forwardly, the lamellar plates of the movable grille being arranged alternately to the lamellar plates of said stationary grille, the movable grille being movable in the fore-and-aft direction with respect to said stationary grille so as to cause the front end portions of the lamellar plates to move toward and away from positions closing said gaps, respectively, and driving means for driving said movable grille to move in the fore-and-aft direction with respect to said stationary grille.

2. A radiator grille structure as set forth in claim 1, in which the front end portions of said movable grille are arranged forwardly of the front end portions of said stationary grille.

3. A radiator grille structure as set forth in claim 1, in which said stationary grille further comprises a plurality of vertically elongated reinforcement members interconnecting said lamellar plates at the rear ends thereof and horizontally spaced apart from each other, and in which said movable grille further comprises a plurality of vertically elongated reinforcement members interconnecting said lamellar plates at the rear ends thereof and horizontally spaced apart from each other, the reinforcement members of the movable grille being arranged alternately to the reinforcement members of said stationary grille.

4. A radiator grille structure as set forth in claim 1, in which said driving means comprises an actuator secured to the vehicle body of the automotive vehicle and having a plunger connected at its leading end to said movable grille.

5. A radiator grille structure as set forth in claim 1, in which said driving means comprises a coiled compression spring having one end connected to the movable grille and the other end connected to the stationary grille.

* * * * *